(12) United States Patent
Marandi

(10) Patent No.: US 6,364,372 B1
(45) Date of Patent: Apr. 2, 2002

(54) FITTING WITH INTEGRAL HALF CLAMP

(76) Inventor: Ali Marandi, 4482 Elm Tree La., Irvine, CA (US) 92715

( * ) Notice: Subject to any disclaimer, the term of this patent is extended or adjusted under 35 U.S.C. 154(b) by 0 days.

(21) Appl. No.: 09/444,223

(22) Filed: Nov. 19, 1999

(51) Int. Cl.$^7$ ................................................ F16L 19/02
(52) U.S. Cl. ........................ 285/367; 285/420; 285/325
(58) Field of Search ................................. 285/420, 423, 285/328, 367, 325, 337

(56) References Cited

U.S. PATENT DOCUMENTS

| | | | | |
|---|---|---|---|---|
| 177,361 A | * | 5/1876 | Stanton ...................... 285/325 |
| 700,340 A | * | 5/1902 | Krantz ................... 285/420 X |
| 1,007,326 A | * | 10/1911 | Boyd ..................... 285/420 X |
| 1,020,002 A | * | 3/1912 | Warner ................... 285/420 X |
| 1,265,875 A | * | 5/1918 | Bissell ........................ 285/325 |
| 1,511,723 A | * | 10/1924 | Draver ........................ 285/322 |
| 2,449,795 A | * | 9/1948 | Stillwagon .............. 285/367 X |
| 3,606,409 A | * | 9/1971 | Hawkins, Jr. ................ 285/302 |
| 4,079,970 A | * | 3/1978 | Brett ....................... 285/367 X |
| 4,627,326 A | * | 12/1986 | McFarland ..................... 84/94 |
| 4,995,647 A | * | 2/1991 | Carey .................... 285/325 X |
| 5,022,685 A | * | 6/1991 | Stiskin et al. ................. 285/45 |
| 5,072,757 A | * | 12/1991 | Lin ........................ 285/325 X |
| 5,398,980 A | * | 3/1995 | Hunter et al. ............... 285/337 |
| 6,012,741 A | * | 1/2000 | Shaffer et al. .......... 285/420 X |
| 6,155,743 A | * | 12/2000 | Chen ..................... 285/420 X |

FOREIGN PATENT DOCUMENTS

CH 669442 * 12/1978 ............. 285/420 X

* cited by examiner

Primary Examiner—Lynne H. Browne
Assistant Examiner—David E. Bochna
(74) Attorney, Agent, or Firm—Boniard I. Brown

(57) ABSTRACT

A fitting for receiving a pipe end portion, typically in an irrigation system, has an integrally formed half clamp cooperating with a separate half clamp to secure the fitting and pipe against separation, the integral half clamp providing a ledge protrusion which positions a pipe disposed thereon for ready insertion into the fitting.

19 Claims, 3 Drawing Sheets

FITTING WITH INTEGRAL HALF CLAMP

BACKGROUND AND SUMMARY OF THE INVENTION

The present invention addresses prior art problems relative to fitting and pipe engagement, gasket blowouts, and thrust blocking.

With fitting arrangements such as the fitting 10 shown in FIG. 1, with an associated system filled with water and pressurized, any one or various combinations of pipe weight, water weight and soil atop the pipe exerts downward force against the frontal opening of the fitting. This can create a gap between a fitting and a pipe 12 end portion therein by deformation or extrusion of the gasket about the pipe under the downward force. With high line pressure and surges, the gasket can deform, bulge outwardly and extrude out through the gap in what is termed in the art a gasket blowout, which can result in washout, erosion, etc.

In large irrigation systems, such as those utilized in golf courses, landscaping, etc., main line pipe systems generally comprise PVC pipes inserted in bell ends of gasketed ductile iron fittings. A general prior art practrice is to provide concrete thrust blocks by pouring and forming cement behind fittings that either cause a change in the direction of flow, such as the elbows, bends, tee's, or a change in the diameter, as by reducer components. Such thrust blocks as shown at 16 in FIG. 2A and at 18 in FIG. 2B can serve to retain pipes and fittings, such as fittings 17 and 19, against disengagement. Thrust blocking, however, relies totally on stable soil conditions. In unstable soils and in imported soils, thrust blocks shift, move and thus provide no effective restraint on fittings, and result in joint separation.

There have been provided in the prior art joint restraints wherein pipes are mechanically joined to fittings. However, such arrangements result in multi-piece assemblies that require care and attention during installation and in service.

Prior art joint restraints typically comprise of two half-clamps secured together by threaded fasteners and clamped about the pipe disposed in a bell-end of a fitting. With such mechanical joint restraint systems, piping systems utilizing the same provide thrust resistance to frictional and soil bearing forces along long lengths of pipe thus joined together. In such arrangements, centering and insertion of a pipe end portion into a bell end of fitting present difficulties generally requiring two persons, one person to locate and center a pipe, and a second person to urge the pipe inwardly into a fitting. With sizable pipes, such a 6" in diameter and larger, this can be an arduous task.

The present invention provides gasketed fitting arrangements wherein at the opening of the fitting, typically a bell-end style fitting, there is provided an outwardly extending integrally-formed half-clamp. Such outwardly extending protrusion provides a ledge. Upon laying a pipe end portion on the ledge, it is automatically centered and aligned for insertion. The pipe is thus readily inserted by a single person simply urging it inwardly into the bell end portion of the fitting.

With metal fittings, the half-clamp protrusion and the separate second half-clamp are preferably provided with raised serrations or ridges to be embedded into pipe end portion to prevent disengagement of the pipe from the fitting. With fittings of PVC plastic, adhesive may be applied to the clamp surfaces to prevent disengagement of the pipe from the fitting.

DESCRIPTION OF THE PREFERRED EMBODIMENT

Figure 3:
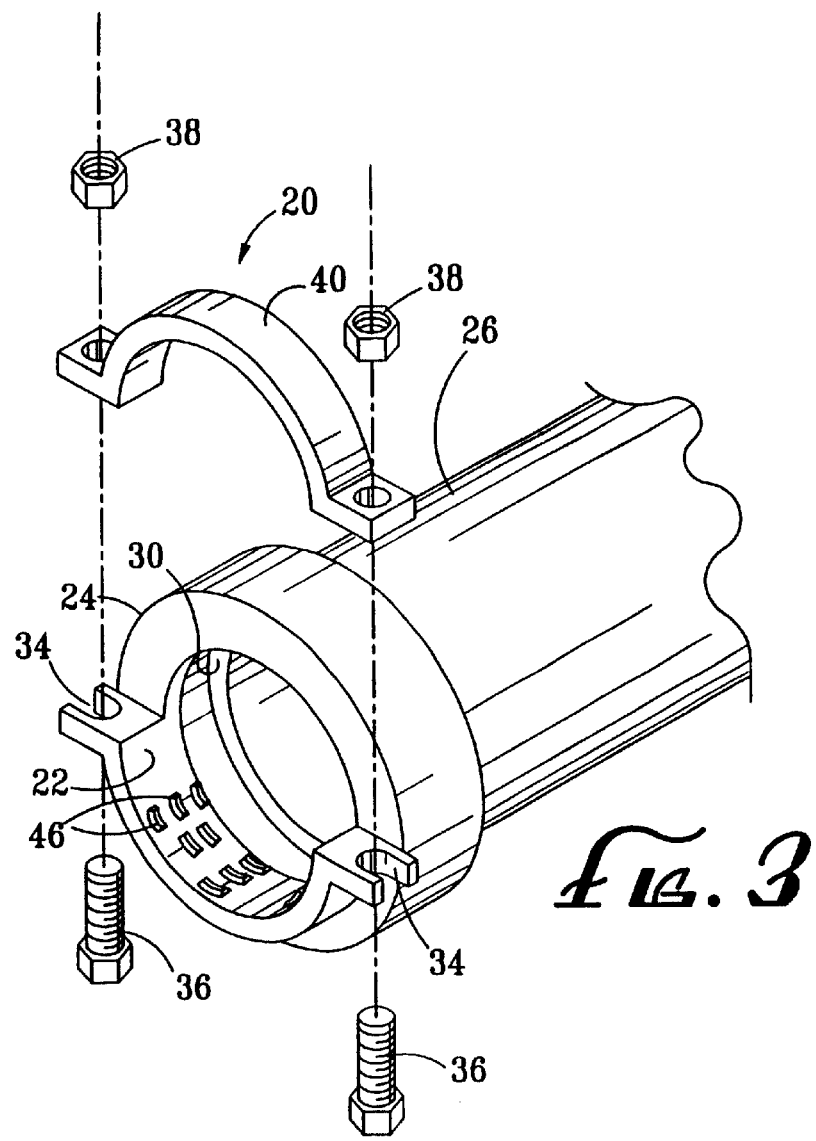
FIG. 3 illustrates a preferred embodiment of the present invention.
Figure 4:
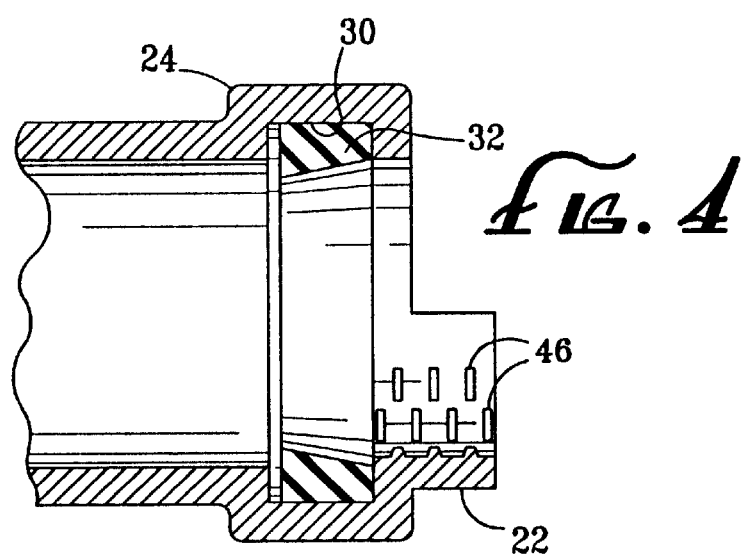
FIG. 4 is a partial sectional view of the apparatus of FIG. 3.

Referring to the drawings, FIGS. 3 and 4 illustrate a preferred embodiment 20 of the apparatus of the invention, wherein an integrally cast half-clamp 22 is defined at the opening of a bell end portion 24 of a fitting 26. The bell end portion has defined therein an annular groove or gasket race 30 wherein is disposed a resilient rubber gasket 32.

The integrally cast clamp portion has slots 34 defined in its outer end portions to accommodate threaded fasteners 36 to cooperate with nuts 38 to secure the integral clamp portion 22 with a separate clamp member 40.

Water distribution and irrigation systems generally utilize gasket-sealed fittings, wherein fitting end portions have gasket races or grooves wherein resilient rubber gaskets are disposed.

Figure 5:
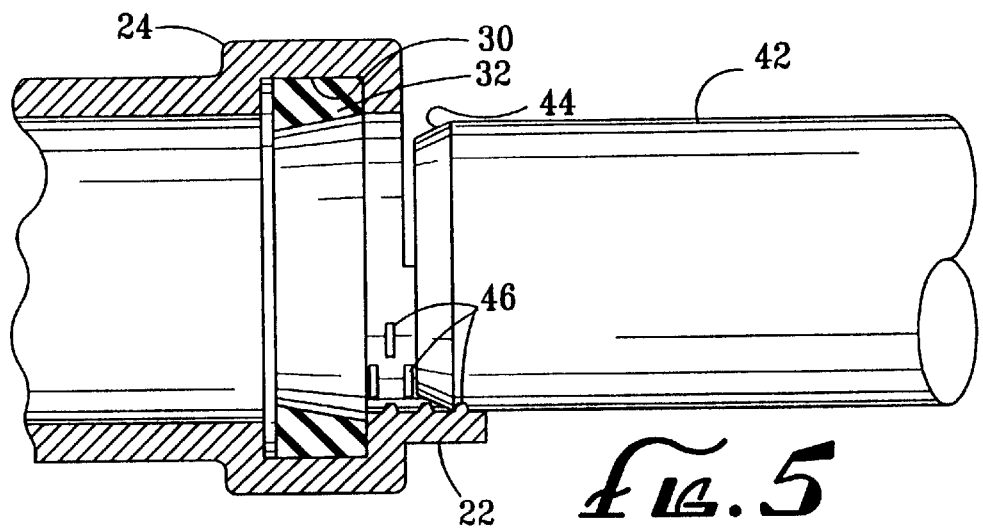
FIGS. 5 and 6 show the fitting of FIGS. 3 and 4 with a pipe end portion positioned for insertion thereinto.

Pipe 42 (FIG. 5) has a beveled end portion 44 insertable into the bell end portion 24 of the device of embodiment or fitting 20. The frontal opening of fitting 20 is somewhat larger in diameter than the diameter of the fitting being inserted.

The clamp portions are secured together by tightening or torquing down bolts 36 relative to nuts 38.

Figure 6:
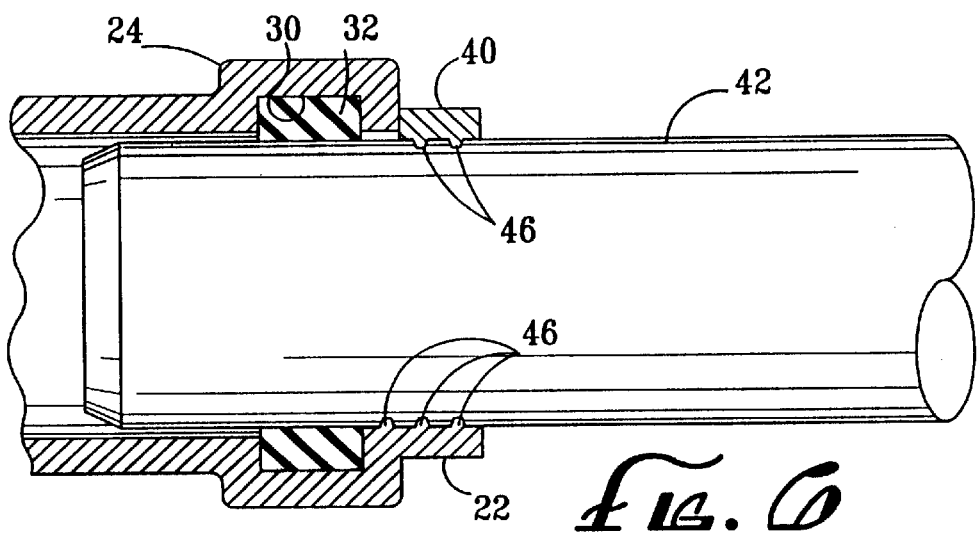
Figure 7:
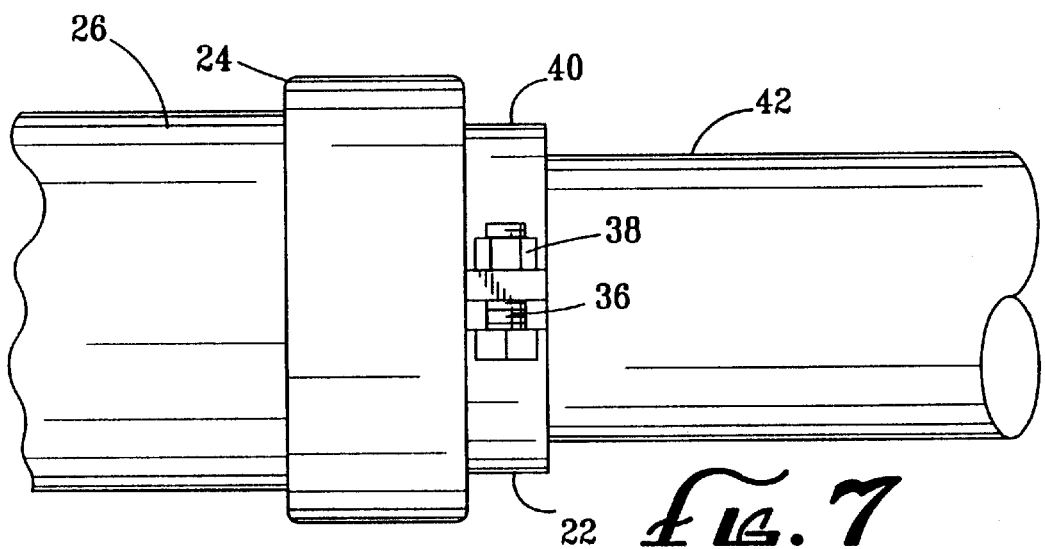
FIG. 7 is an elevational view of the assembly of FIG. 6.

Defined on the surface of clamp portion 22 and on the cooperating surface of the separate clamp member 40 is a plurality of serrations or ridges 46 which, when the clamps are firmly secured together by bolts 36 or threaded fasteners, are forced or embedded into the inserted pipe section to prevent pipe slippage or disengagement (FIG. 6). The serrations are utilized with metal members, typically of ductile iron. For plastic fittings and pipe, typically of PVC, serrations are omitted, and adhesive, such as PVC glue, is applied to the clamp surfaces to prevent disengagement of the pipe from the fitting.

With the two clamp portions secured together, the clamp half 22 prevents the gasket material from being extruded outwardly.

Figure 1:
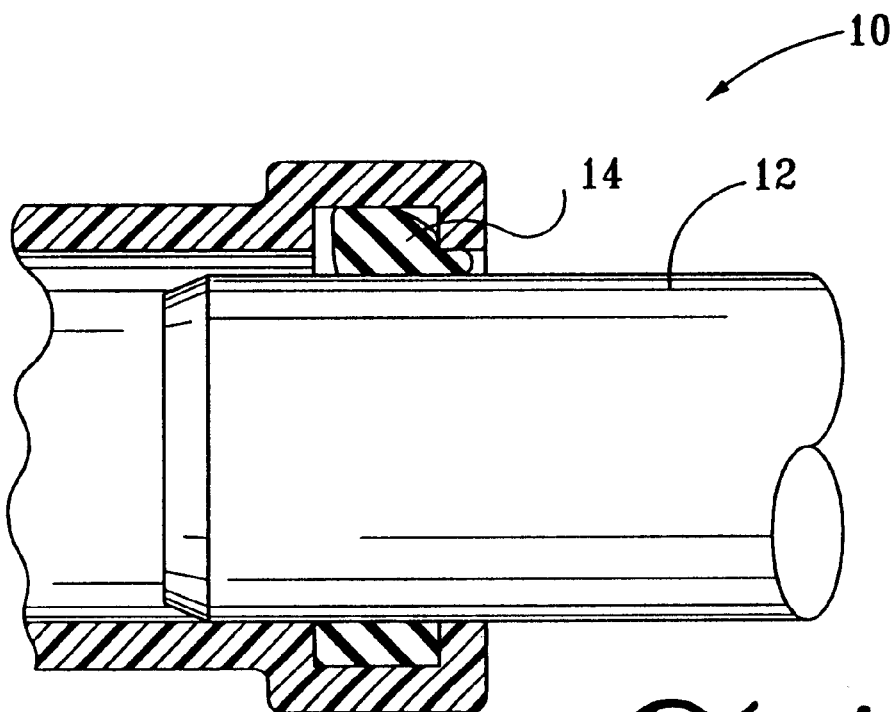
FIG. 1 shows a prior art arrangement wherein a pipe is inserted into a fitting bell end and is surrounded by a gasket.
Figure 2A:
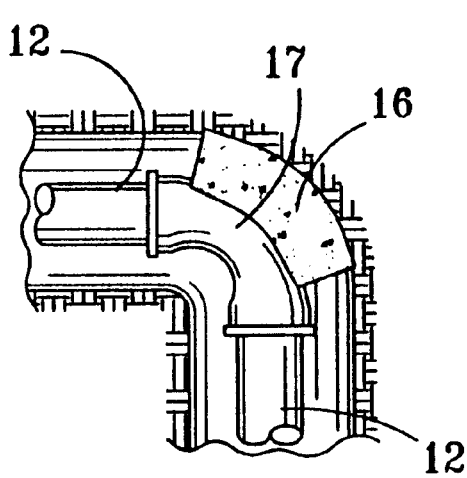
FIGS. 2A and 2B show prior art thrust block arrangements for resisting forces exerted on fittings, including the pressure of water in conduits.
Figure 2B:
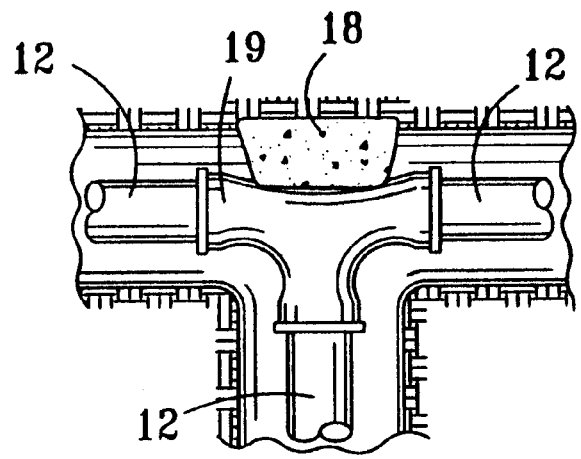

As best shown in FIGS. 1 and 4, an outwardly protruding ledge or protrusion is defined by the integral half clamp 22. In the assembly process, the fitting or pipe end portion is disposed on the ledge 22, and is thereby positioned and centered for insertion. One person is able to thus position and to urge a fitting end portion into the opening of the bell end portion 24. This contrasts with prior art arrangements wherein two persons are required for insertion of a fitting end portion, one person holding a pipe or fitting end portion centered and in position for insertion, and a second person to urge the fitting end portion into the opening.

It will be understood that various changes and modifications may be made from the preferred embodiments discussed above without departing from the scope of the present invention, which is established by the following claims and equivalents thereof.

The inventor claims:

1. In a coupling wherein a fitting receives a pipe end portion and is secured thereto by clamp members extending thereabout to be secured by fasteners, the combination comprising:

a resilient gasket mounted in a groove in said fitting to encircle said pipe end portion to provide a resilient seal between the fitting and the pipe end portion, and one of said clamp members being a lower clamp member on the fitting and extending therefrom to support and coaxially align said conduit pipe end portion with the fitting for urging thereof into the fitting for securement together by said fasteners.

2. The combination according to claim 1, wherein:

said fitting has a tubular body portion and an end portion sized and adapted to be disposed about said pipe end portion.

3. The combination according to claim 1, wherein said groove is annular and is defined in the end portion of said fitting to receive said resilient gasket.

4. The combination according to claim 1, and further comprising:

a plurality of serrations defined on an inner surface of the integrally formed clamp member for penetration and embedding into the pipe end portion to resist disengagement of the pipe end portion from the fitting.

5. The combination according to claim 4, and further including a plurality of serrations defined on an inner surface of said separate clamp member.

6. The combination according to claim 1, wherein the fitting and the pipe end portion are formed of ductile iron.

7. A combination according to claim 1, wherein the fitting and the pipe end portion are formed of PVC plastic.

8. A combination according to claim 7, wherein:

the fitting and the pipe end portion are secured together by an appropriate adhesive applied to the engaging surfaces of the clamp members and the pipe end portion to prevent separation of the fitting and pipe end portion.

9. The combination according to claim 1, wherein:

said gasket has a frusto-conical taper inwardly of the fitting for improved engagement with the pipe end portion.

10. A combination according to claim 1, wherein:

said groove is defined in said fitting inwardly of said lower clamp member to facilitate insertion of a pipe end portion into the fitting.

11. In a coupling wherein a fitting receives a pipe end portion securable thereto by clamp members extending thereabout and secured by fasteners, the combination comprising:

one of said clamp members being integral with and extending from a lower portion of the fitting to define a ledge protrusion extending longitudinally of the fitting, gasket means mounted in a groove in said fitting to encircle said pipe end portion for resilient sealing between the fitting and the pipe end portion, and whereby upon positioning of the pipe end portion on the ledge protrusion, the pipe end portion is automatically aligned for insertion into the fitting, as by a hand of a person prior to securement together of the clamp members.

12. A combination according to claim 11, wherein said fitting and pipe end portion are formed of metal.

13. A combination according to claim 12, wherein the fitting and the pipe end portion are formed of ductile iron.

14. A combination according to claim 12, and further comprising:

a plurality of serrations defined on an inner surface of the integrally formed clamp member for penetration and embedding into the pipe end portion to resist disengagement of the pipe end portion from the fitting.

15. A combination according to claim 14, and further including a plurality of serrations defined on an inner surface of said separate clamp member.

16. The combination according to claim 11, wherein:

said gasket has a frusto-conical taper inwardly of the fitting for improved engagement with the pipe end portion.

17. A combination according to claim 16, wherein:

said gasket is disposed in a groove defined in the fitting inwardly of the clamp member extending from a lower portion of the fitting to facilitate insertion of a pipe end portion into the fitting.

18. A combination according to claim 11, wherein:

said groove is defined in said fitting inwardly of said clamp member extending from a lower portion of the fitting to facilitate insertion of a pipe end portion into the fitting.

19. The combination according to claim 11, wherein:

said fitting and said pipe end portion are formed of PVC plastic, and the fitting and the pipe end portion are secured together by appropriate adhesive applied to engaging surfaces of the clamp members and the pipe end portion to prevent separation of the fitting from the pipe end portion.

* * * * *